United States Patent [19]

Nishino et al.

[11] Patent Number: 4,670,856

[45] Date of Patent: Jun. 2, 1987

[54] DATA STORAGE APPARATUS

[75] Inventors: Yasukazu Nishino, Osaka; Hiroshi Sasanuma, Hirakata, both of Japan

[73] Assignee: Matsushita Electric Industrial Co., Ltd., Osaka, Japan

[21] Appl. No.: 709,290

[22] Filed: Mar. 7, 1985

[51] Int. Cl.[4] .............................................. G06T 7/00
[52] U.S. Cl. .................................................... 364/900
[58] Field of Search ... 364/200 MS File, 900 MS File; 307/303; 365/49, 50

[56] References Cited

U.S. PATENT DOCUMENTS

| | | | |
|---|---|---|---|
| 3,320,594 | 5/1967 | Davies | 364/200 |
| 3,350,698 | 10/1967 | Pritchard | 364/200 |
| 3,800,289 | 3/1974 | Batcher | 364/200 |
| 3,812,467 | 5/1974 | Batcher | 364/900 |
| 3,936,806 | 2/1976 | Batcher | 364/200 |

Primary Examiner—David Y. Eng
Attorney, Agent, or Firm—Spencer & Frank

[57] ABSTRACT

A data storage apparatus comprises a memory circuit including $2^{n_1 \cdot n_2}$ memories for storing binary information. Data of N bits from the row direction and column direction can be written and read out in parallel, and, also, such data of N bits reduced with a data reduction rate of an exponential power of 2 can be written and read out in parallel. The apparatus is used, for example, for displaying data on a display by fetching the data from common file servers connected to a private network or the like.

6 Claims, 21 Drawing Figures

FIG. 1

|       | (1,1) | (1,2) | (1,3) | | (1,8) | (1,9) | (1,10) | (1,11) | | (1,16) |
|---|---|---|---|---|---|---|---|---|---|---|
|       | (2,1) | (2,2) | (2,3) | | (2,8) | (2,9) | (2,10) | (2,11) | | (2,16) |
|       | (3,1) | (3,2) | (3,3) | | (3,8) | (3,9) | (3,10) | (3,11) | | (3,16) |
|       |       |       |       | |       |       |        |        | |        |
|       | (8,1) | (8,2) | (8,3) | | (8,8) | (8,9) | (8,10) | (8,11) | | (8,16) |
|       | (9,1) | (9,2) | (9,3) | | (9,8) | (9,9) | (9,10) | (9,11) | | (9,16) |
|       | (10,1)| (10,2)| (10,3)| | (10,8)| (10,9)| (10,10)| (10,11)| | (10,16)|
|       | (11,1)| (11,2)| (11,3)| | (11,8)| (11,9)| (11,10)| (11,11)| | (11,16)|
|       |       |       |       | |       |       |        |        | |        |
|       | (16,1)| (16,2)| (16,3)| | (16,8)| (16,9)| (16,10)| (16,11)| | (16,16)|

16 BITS × 16 BITS

FIG. 2

| ADDRESS | $m_1$ | $m_2$ | $m_3$ | $m_4$ | $m_5$ | $m_6$ | $m_7$ | $m_8$ |
|---|---|---|---|---|---|---|---|---|
| $32k_0 + 0$ | (1,1) | (1,2) | (1,3) | (1,4) | (1,5) | (1,6) | (1,7) | (1,8) |
| $32k_0 + 1$ | (2,8) | (2,1) | (2,2) | (2,3) | (2,4) | (2,5) | (2,6) | (2,7) |
| | | | | | | | | |
| $32k_0 + 7$ | (8,2) | (8,3) | (8,4) | (8,5) | (8,6) | (8,7) | (8,8) | (8,1) |
| $32k_0 + 8$ | (1,16) | (1,9) | (1,10) | (1,11) | (1,12) | (1,13) | (1,14) | (1,15) |
| $32k_0 + 9$ | (2,15) | (2,16) | (2,9) | (2,10) | (2,11) | (2,12) | (2,13) | (2,14) |
| | | | | | | | | |
| $32k_0 + 15$ | (8,9) | (8,10) | (8,11) | (8,12) | (8,13) | (8,14) | (8,15) | (8,16) |
| $32k_0 + 16$ | (9,8) | (9,1) | (9,2) | (9,3) | (9,4) | (9,5) | (9,6) | (9,7) |
| $32k_0 + 17$ | (10,7) | (10,8) | (10,1) | (10,2) | (10,3) | (10,4) | (10,5) | (10,6) |
| | | | | | | | | |
| $32k_0 + 23$ | (16,1) | (16,2) | (16,3) | (16,4) | (16,5) | (16,6) | (16,7) | (16,8) |
| $32k_0 + 24$ | (9,15) | (9,16) | (9,9) | (9,10) | (9,11) | (9,12) | (9,13) | (9,14) |
| $32k_0 + 25$ | (10,14) | (10,15) | (10,16) | (10,9) | (10,10) | (10,11) | (10,12) | (10,13) |
| | | | | | | | | |
| $32k_0 + 31$ | (16,6) | (16,9) | (16,10) | (16,11) | (16,12) | (16,13) | (16,14) | (16,15) |

FIG. 3

| | $m_1$ | $m_2$ | $m_3$ | $m_4$ | $m_5$ | $m_6$ | $m_7$ | $m_8$ |
|---|---|---|---|---|---|---|---|---|
| 1ST COLUMN | 0(7) | 1(0) | 2(1) | 3(2) | 4(3) | 5(4) | 6(5) | 7(6) |
| 2ND COLUMN | 7(6) | 0(7) | 1(0) | 2(1) | 3(2) | 4(3) | 5(4) | 6(5) |
| 3RD COLUMN | 6(5) | 7(6) | 0(7) | 1(0) | 2(1) | 3(2) | 4(3) | 5(4) |
| 4TH COLUMN | 5(4) | 6(5) | 7(6) | 0(7) | 1(0) | 2(1) | 3(2) | 4(3) |
| 5TH COLUMN | 4(3) | 5(4) | 6(5) | 7(6) | 0(7) | 1(0) | 2(1) | 3(2) |
| 6TH COLUMN | 3(2) | 4(3) | 5(4) | 6(5) | 7(6) | 0(7) | 1(0) | 2(1) |
| 7TH COLUMN | 2(1) | 3(2) | 4(3) | 5(4) | 6(5) | 7(6) | 0(7) | 1(0) |
| 8TH COLUMN | 1(0) | 2(1) | 3(2) | 4(3) | 5(4) | 6(5) | 7(6) | 0(7) |
| 9TH COLUMN | 7(6) | 0(7) | 1(0) | 2(1) | 3(2) | 4(3) | 5(4) | 6(5) |
| 10TH COLUMN | 6(5) | 7(6) | 0(7) | 1(0) | 2(1) | 3(2) | 4(3) | 5(4) |
| 11TH COLUMN | 5(4) | 6(5) | 7(6) | 0(7) | 1(0) | 2(1) | 3(2) | 4(3) |
| 12TH COLUMN | 4(3) | 5(4) | 6(5) | 7(6) | 0(7) | 1(0) | 2(1) | 3(2) |
| 13TH COLUMN | 3(2) | 4(3) | 5(4) | 6(5) | 7(6) | 0(7) | 1(0) | 2(1) |
| 14TH COLUMN | 2(1) | 3(2) | 4(3) | 5(4) | 6(5) | 7(6) | 0(7) | 1(0) |
| 15TH COLUMN | 1(0) | 2(1) | 3(2) | 4(3) | 5(4) | 6(5) | 7(6) | 0(7) |
| 16TH COLUMN | 0(7) | 1(0) | 2(1) | 3(2) | 4(3) | 5(4) | 6(5) | 7(6) |

| (1.1) | (1.2) | (1.3) | (1.4) | (1.5) | (1.6) | (1.7) | (1.8) |
|---|---|---|---|---|---|---|---|
| (2.1) | (2.2) | (2.3) | (2.4) | (2.5) | (2.6) | (2.7) | (2.8) |
| (3.1) | (3.2) | (3.3) | (3.4) | (3.5) | (3.6) | (3.7) | (3.8) |
| (4.1) | (4.2) | (4.3) | (4.4) | (4.5) | (4.6) | (4.7) | (4.8) |
| (5.1) | (5.2) | (5.3) | (5.4) | (5.5) | (5.6) | (5.7) | (5.8) |
| (6.1) | (6.2) | (6.3) | (6.4) | (6.5) | (6.6) | (6.7) | (6.8) |
| (7.1) | (7.2) | (7.3) | (7.4) | (7.5) | (7.6) | (7.7) | (7.8) |
| (8.1) | (8.2) | (8.3) | (8.4) | (8.5) | (8.6) | (8.7) | (8.8) |

FIG. 9

| S2 S1 S0 | | | |
|---|---|---|---|
| 0 0 0 | PERMUTATION P0 | 1 2 3 4 5 6 7 8 | (ORIGINAL DATA) |
| 0 0 1 | PERMUTATION P1 | 2 1 4 3 6 5 8 7 | |
| 0 1 0 | PERMUTATION P2 | 3 4 1 2 7 8 5 6 | |
| 0 1 1 | PERMUTATION P3 | 4 3 2 1 8 7 6 5 | |
| 1 0 0 | PERMUTATION P4 | 5 6 7 8 1 2 3 4 | |
| 1 0 1 | PERMUTATION P5 | 6 5 8 7 2 1 4 3 | |
| 1 1 0 | PERMUTATION P6 | 7 8 5 6 3 4 1 2 | |
| 1 1 1 | PERMUTATION P7 | 8 7 6 5 4 3 2 1 | |

$t_0 = 1$ (ROW DIRECTION), $t_0 = 0$ (COLUMN DIRECTION)
$t_1 = 1$ (WITHOUT DATA REDUCTION), $t_1 = 0$ (WITH DATA REDUCTION)

INVERSE SHUFFLE

FIG. 14 (I)

| ADDRESS | $m_1$ | $m_2$ | $m_3$ | $m_4$ | $m_5$ | $m_6$ | $m_7$ | $m_8$ |
|---|---|---|---|---|---|---|---|---|
| $32k_0 + 0$ | <1.1> (1.1) | <1.1> (1.2) | <1.1> (1.3) | <1.1> (1.4) | <1.1> (1.5) | <1.1> (1.6) | <1.1> (1.7) | <1.1> (1.8) |
| $32k_0 + 1$ | <1.1> (2.2) | <1.1> (2.1) | <1.1> (2.4) | <1.1> (2.3) | <1.1> (2.6) | <1.1> (2.5) | <1.1> (2.8) | <1.1> (2.7) |
| $32k_0 + 2$ | <1.1> (3.3) | <1.1> (3.4) | <1.1> (3.1) | <1.1> (3.2) | <1.1> (3.7) | <1.1> (3.8) | <1.1> (3.5) | <1.1> (3.6) |
| $32k_0 + 3$ | <1.1> (4.4) | <1.1> (4.3) | <1.1> (4.2) | <1.1> (4.1) | <1.1> (4.8) | <1.1> (4.7) | <1.1> (4.6) | <1.1> (4.5) |
| $32k_0 + 4$ | <1.1> (5.5) | <1.1> (5.6) | <1.1> (5.7) | <1.1> (5.8) | <1.1> (5.1) | <1.1> (5.2) | <1.1> (5.3) | <1.1> (5.4) |
| $32k_0 + 5$ | <1.1> (6.6) | <1.1> (6.5) | <1.1> (6.8) | <1.1> (6.7) | <1.1> (6.2) | <1.1> (6.1) | <1.1> (6.4) | <1.1> (6.3) |
| $32k_0 + 6$ | <1.1> (7.7) | <1.1> (7.8) | <1.1> (7.5) | <1.1> (7.6) | <1.1> (7.3) | <1.1> (7.4) | <1.1> (7.1) | <1.1> (7.2) |
| $32k_0 + 7$ | <1.1> (8.8) | <1.1> (8.7) | <1.1> (8.6) | <1.1> (8.5) | <1.1> (8.4) | <1.1> (8.3) | <1.1> (8.2) | <1.1> (8.1) |
| $32k_0 + 8$ | <1.2> (1.2) | <1.2> (1.1) | <1.2> (1.4) | <1.2> (1.3) | <1.2> (1.6) | <1.2> (1.5) | <1.2> (1.8) | <1.2> (1.7) |
| $32k_0 + 9$ | <1.2> (2.1) | <1.2> (2.2) | <1.2> (2.3) | <1.2> (2.4) | <1.2> (2.5) | <1.2> (2.6) | <1.2> (2.7) | <1.2> (2.8) |
| $32k_0 + 10$ | <1.2> (3.4) | <1.2> (3.3) | <1.2> (3.2) | <1.2> (3.1) | <1.2> (3.8) | <1.2> (3.7) | <1.2> (3.6) | <1.2> (3.5) |
| $32k_0 + 11$ | <1.2> (4.3) | <1.2> (4.4) | <1.2> (4.1) | <1.2> (4.2) | <1.2> (4.7) | <1.2> (4.8) | <1.2> (4.5) | <1.2> (4.6) |
| $32k_0 + 12$ | <1.2> (5.6) | <1.2> (5.5) | <1.2> (5.8) | <1.2> (5.7) | <1.2> (5.2) | <1.2> (5.1) | <1.2> (5.4) | <1.2> (5.3) |
| $32k_0 + 13$ | <1.2> (6.5) | <1.2> (6.6) | <1.2> (6.7) | <1.2> (6.8) | <1.2> (6.1) | <1.2> (6.2) | <1.2> (6.3) | <1.2> (6.4) |
| $32k_0 + 14$ | <1.2> (7.8) | <1.2> (7.7) | <1.2> (7.6) | <1.2> (7.5) | <1.2> (7.4) | <1.2> (7.3) | <1.2> (7.2) | <1.2> (7.1) |
| $32k_0 + 15$ | <1.2> (8.7) | <1.2> (8.8) | <1.2> (8.5) | <1.2> (8.6) | <1.2> (8.3) | <1.2> (8.4) | <1.2> (8.1) | <1.2> (8.2) |

FIG. 14 (II)

| ADDRESS | $m_1$ | $m_2$ | $m_3$ | $m_4$ | $m_5$ | $m_6$ | $m_7$ | $m_8$ |
|---|---|---|---|---|---|---|---|---|
| $32k_0 + 16$ | <2.1>(1.2) | <2.1>(1.1) | <2.1>(1.4) | <2.1>(1.3) | <2.1>(1.6) | <2.1>(1.5) | <2.1>(1.8) | <2.1>(1.7) |
| $32k_0 + 17$ | <2.1>(2.1) | <2.1>(2.2) | <2.1>(2.3) | <2.1>(2.4) | <2.1>(2.5) | <2.1>(2.6) | <2.1>(2.7) | <2.1>(2.8) |
| $32k_0 + 18$ | <2.1>(3.4) | <2.1>(3.3) | <2.1>(3.2) | <2.1>(3.1) | <2.1>(3.8) | <2.1>(3.7) | <2.1>(3.6) | <2.1>(3.5) |
| $32k_0 + 19$ | <2.1>(4.3) | <2.1>(4.4) | <2.1>(4.1) | <2.1>(4.2) | <2.1>(4.7) | <2.1>(4.8) | <2.1>(4.5) | <2.1>(4.6) |
| $32k_0 + 20$ | <2.1>(5.6) | <2.1>(5.5) | <2.1>(5.8) | <2.1>(5.7) | <2.1>(5.2) | <2.1>(5.1) | <2.1>(5.4) | <2.1>(5.3) |
| $32k_0 + 21$ | <2.1>(6.5) | <2.1>(6.6) | <2.1>(6.7) | <2.1>(6.8) | <2.1>(6.1) | <2.1>(6.2) | <2.1>(6.3) | <2.1>(6.4) |
| $32k_0 + 22$ | <2.1>(7.8) | <2.1>(7.7) | <2.1>(7.6) | <2.1>(7.5) | <2.1>(7.4) | <2.1>(7.3) | <2.1>(7.2) | <2.1>(7.1) |
| $32k_0 + 23$ | <2.1>(8.7) | <2.1>(8.8) | <2.1>(8.5) | <2.1>(8.6) | <2.1>(8.3) | <2.1>(8.4) | <2.1>(8.1) | <2.1>(8.2) |
| $32k_0 + 24$ | <2.2>(1.1) | <2.2>(1.2) | <2.2>(1.3) | <2.2>(1.4) | <2.2>(1.5) | <2.2>(1.6) | <2.2>(1.7) | <2.2>(1.8) |
| $32k_0 + 25$ | <2.2>(2.3) | <2.2>(2.1) | <2.2>(2.4) | <2.2>(2.3) | <2.2>(2.6) | <2.2>(2.5) | <2.2>(2.8) | <2.2>(2.7) |
| $32k_0 + 26$ | <2.2>(3.3) | <2.2>(3.4) | <2.2>(3.1) | <2.2>(3.2) | <2.2>(3.7) | <2.2>(3.8) | <2.2>(3.5) | <2.2>(3.6) |
| $32k_0 + 27$ | <2.2>(4.4) | <2.2>(4.3) | <2.2>(4.2) | <2.2>(4.1) | <2.2>(4.8) | <2.2>(4.7) | <2.2>(4.6) | <2.2>(4.5) |
| $32k_0 + 28$ | <2.2>(5.5) | <2.2>(5.6) | <2.2>(5.7) | <2.2>(5.8) | <2.2>(5.1) | <2.2>(5.2) | <2.2>(5.3) | <2.2>(5.4) |
| $32k_0 + 29$ | <2.2>(6.6) | <2.2>(6.5) | <2.2>(6.8) | <2.2>(6.7) | <2.2>(6.2) | <2.2>(6.1) | <2.2>(6.4) | <2.2>(6.3) |
| $32k_0 + 30$ | <2.2>(7.7) | <2.2>(7.8) | <2.2>(7.5) | <2.2>(7.6) | <2.2>(7.3) | <2.2>(7.4) | <2.2>(7.1) | <2.2>(7.2) |
| $32k_0 + 31$ | <2.2>(8.8) | <2.2>(8.7) | <2.2>(8.6) | <2.2>(8.5) | <2.2>(8.4) | <2.2>(8.3) | <2.2>(8.2) | <2.2>(8.1) |

FIG. 15

|  |  | $m_1$ | $m_2$ | $m_3$ | $m_4$ | $m_5$ | $m_6$ | $m_7$ | $m_8$ |
|---|---|---|---|---|---|---|---|---|---|
| SUB-BLOCK <1,1> | 1ST COLUMN | 0 | 1 | 2 | 3 | 4 | 5 | 6 | 7 |
| | 2ND COLUMN | 1 | 0 | 3 | 2 | 5 | 4 | 7 | 6 |
| | 3RD COLUMN | 2 | 3 | 0 | 1 | 6 | 7 | 4 | 5 |
| | 4TH COLUMN | 3 | 2 | 1 | 0 | 7 | 6 | 5 | 4 |
| | 5TH COLUMN | 4 | 5 | 6 | 7 | 0 | 1 | 2 | 3 |
| | 6TH COLUMN | 5 | 4 | 7 | 6 | 1 | 0 | 3 | 2 |
| | 7TH COLUMN | 6 | 7 | 4 | 5 | 2 | 3 | 0 | 1 |
| | 8TH COLUMN | 7 | 6 | 5 | 4 | 3 | 2 | 1 | 0 |
| SUB-BLOCK <1,2> | 1ST COLUMN | 9 | 8 | 11 | 10 | 13 | 12 | 15 | 14 |
| | 2ND COLUMN | 8 | 9 | 10 | 11 | 12 | 13 | 14 | 15 |
| | 3RD COLUMN | 11 | 10 | 9 | 8 | 15 | 14 | 13 | 12 |
| | 4TH COLUMN | 10 | 11 | 8 | 9 | 14 | 15 | 12 | 13 |
| | 5TH COLUMN | 13 | 12 | 15 | 14 | 9 | 8 | 11 | 10 |
| | 6TH COLUMN | 12 | 13 | 14 | 15 | 8 | 9 | 10 | 11 |
| | 7TH COLUMN | 15 | 14 | 13 | 12 | 11 | 10 | 9 | 8 |
| | 8TH COLUMN | 14 | 15 | 12 | 13 | 10 | 11 | 8 | 9 |
| SUB BLOCK <2,1> | 1ST COLUMN | 17 | 16 | 19 | 18 | 21 | 20 | 23 | 22 |
| | 2ND COLUMN | 16 | 17 | 18 | 19 | 20 | 21 | 22 | 23 |
| | 3RD COLUMN | 19 | 18 | 17 | 16 | 23 | 22 | 21 | 20 |
| | 4TH COLUMN | 18 | 19 | 16 | 17 | 22 | 23 | 20 | 21 |
| | 5TH COLUMN | 21 | 20 | 23 | 22 | 17 | 16 | 19 | 18 |
| | 6TH COLUMN | 20 | 21 | 22 | 23 | 16 | 17 | 18 | 19 |
| | 7TH COLUMN | 23 | 22 | 21 | 20 | 19 | 18 | 17 | 16 |
| | 8TH COLUMN | 22 | 23 | 20 | 21 | 18 | 19 | 16 | 17 |
| SUB-BLOCK <2,2> | 1ST COLUMN | 24 | 25 | 26 | 27 | 28 | 29 | 30 | 31 |
| | 2ND COLUMN | 25 | 24 | 27 | 26 | 29 | 28 | 31 | 30 |
| | 3RD COLUMN | 26 | 27 | 24 | 25 | 30 | 31 | 28 | 29 |
| | 4TH COLUMN | 27 | 26 | 25 | 24 | 31 | 30 | 29 | 28 |
| | 5TH COLUMN | 28 | 29 | 30 | 31 | 24 | 25 | 26 | 27 |
| | 6TH COLUMN | 29 | 28 | 31 | 30 | 25 | 24 | 27 | 26 |
| | 7TH COLUMN | 30 | 31 | 28 | 29 | 26 | 27 | 24 | 25 |
| | 8TH COLUMN | 31 | 30 | 29 | 28 | 27 | 26 | 25 | 24 |

FIG. 16

|  | $m_1$ | $m_2$ | $m_3$ | $m_4$ | $m_5$ | $m_6$ | $m_7$ | $m_8$ |
|---|---|---|---|---|---|---|---|---|
| 1ST ROW | 0 | 8 | 0 | 8 | 0 | 8 | 0 | 8 |
| 2ND ROW | 9 | 1 | 9 | 1 | 9 | 1 | 9 | 1 |
| 3RD ROW | 2 | 10 | 2 | 10 | 2 | 10 | 2 | 10 |
| 4TH ROW | 11 | 3 | 11 | 3 | 11 | 3 | 11 | 3 |
| 5TH ROW | 4 | 12 | 4 | 12 | 4 | 12 | 4 | 12 |
| 6TH ROW | 13 | 5 | 13 | 5 | 13 | 5 | 13 | 5 |
| 7TH ROW | 6 | 14 | 6 | 14 | 6 | 14 | 6 | 14 |
| 8TH ROW | 15 | 7 | 15 | 7 | 15 | 7 | 15 | 7 |
| 9TH ROW | 24 | 16 | 24 | 16 | 24 | 16 | 24 | 16 |
| 10TH ROW | 17 | 25 | 17 | 25 | 17 | 25 | 17 | 25 |
| 11TH ROW | 26 | 18 | 26 | 18 | 26 | 18 | 26 | 18 |
| 12TH ROW | 19 | 27 | 19 | 27 | 19 | 27 | 19 | 27 |
| 13TH ROW | 28 | 20 | 28 | 20 | 28 | 20 | 28 | 20 |
| 14TH ROW | 21 | 29 | 21 | 29 | 21 | 29 | 21 | 29 |
| 15TH ROW | 30 | 22 | 30 | 22 | 30 | 22 | 30 | 22 |
| 16TH ROW | 23 | 31 | 23 | 31 | 23 | 31 | 23 | 31 |

FIG. 18

|  | $m_1$ | $m_2$ | $m_3$ | $m_4$ | $m_5$ | $m_6$ | $m_7$ | $m_8$ |
|---|---|---|---|---|---|---|---|---|
| 1ST COLUMN | 0 | 16 | 2 | 18 | 4 | 20 | 6 | 22 |
| 2ND COLUMN | 16 | 0 | 18 | 2 | 20 | 4 | 22 | 6 |
| 3RD COLUMN | 2 | 18 | 0 | 16 | 6 | 22 | 4 | 20 |
| 4TH COLUMN | 18 | 2 | 16 | 0 | 22 | 6 | 20 | 4 |
| 5TH COLUMN | 4 | 20 | 6 | 22 | 0 | 16 | 2 | 18 |
| 6TH COLUMN | 20 | 4 | 22 | 6 | 16 | 0 | 18 | 2 |
| 7TH COLUMN | 6 | 22 | 4 | 20 | 2 | 18 | 0 | 16 |
| 8TH COLUMN | 22 | 6 | 20 | 4 | 18 | 2 | 16 | 0 |
| 9TH COLUMN | 24 | 8 | 26 | 10 | 28 | 12 | 30 | 14 |
| 10TH COLUMN | 8 | 24 | 10 | 26 | 12 | 28 | 14 | 30 |
| 11TH COLUMN | 26 | 10 | 24 | 8 | 30 | 14 | 28 | 12 |
| 12TH COLUMN | 10 | 26 | 8 | 24 | 14 | 30 | 12 | 28 |
| 13TH COLUMN | 28 | 12 | 30 | 14 | 24 | 8 | 26 | 10 |
| 14TH COLUMN | 12 | 28 | 14 | 30 | 8 | 24 | 10 | 26 |
| 15TH COLUMN | 30 | 14 | 28 | 12 | 26 | 10 | 24 | 8 |
| 16TH COLUMN | 14 | 30 | 12 | 28 | 10 | 26 | 8 | 24 |

FIG. 17

DATA STORAGE APPARATUS

BACKGROUND OF THE INVENTION

In connection with storage of data, a method has been proposed in which data can be written in and read out in bit-parallel relation of N bits from independently operable $N=2^{n1}$ memories in the row direction and column direction and in which, when the data reduction rate is an exponential power of 2, reduced data can be written in and read out from the N memories in bit-parallel relation of $2^{n1}$ bits in the row direction and column direction. The proposed method is such that all the data are divided into blocks each including $2^{n1+n2}$ bits in the row direction and $2^{n1+n2}$ bits in the column direction, where $2^{n2}$ is the maximum data reduction rate, and each of the blocks composed of $2^{n1+n2} \times 2^{n1+n2}$ bits is used as a unit to be processed. According to the proposed method, the data are allocated to the N memories capable of making independent parallel operation so that the data in each of individual groups may not be allocated to the same memory when the results of sampling of the data in the same row and same column in the block at a bit interval of $2^h$ ($0 \leq h \leq n_2$) are grouped into groups of N bits.

To explain the above method in which all the data in the individual groups can be allocated to the different memories when the results of sampling of the data in the same row and same column in the block at the bit interval of $2^h$ ($0 \leq h \leq n_2$) are grouped into the groups of $N=2^{n1}$ bits, suppose, for example, the case where $N=8$ and $n_2=1$. According to the proposed method, the former 8 bits of the data in an i-th row ($i=1-8$) in the block are subjected to an $(i-1)$-bit cyclic shift to be stored at an address $(32k_0+i-1)$ in the memories $m_1$ to $m_8$ respectively; the latter 8 bits of the data in the i-th row ($i=i-8$) are subjected to an i-bit cyclic shift to be stored at an address $(32k_0+i+7)$ in the respective memories $m_1$ to $m_8$; the former 8 bits of the data in an i-th row ($i=9-16$) are subjected to an $(i-8)$-bit cyclic shift to be stored at an address $(32k_0+i+7)$ in the respective memories $m_1$ to $m_8$; and the latter 8 bits of the data in the i-th row ($i=9-16$) are subjected to an $(i-7)$-bit cyclic shift to be stored at an address $(32k_0+i+15)$ in the respective memories $m_1$ to $m_8$. FIG. 1 shows the numbered data of $16 \times 16$ bits, and FIG. 2 shows that the data shown in FIG. 1 are allocated to and stored at the individual addresses in the memories $m_1$ to $m_8$ according to the proposed method.

FIG. 3 shows the less-significant address values applied to the memories $m_1$ to $m_8$ during data writing and reading in the column direction when the data are allocated to the memories in the manner shown in FIG. 2. It will be apparent from FIG. 3 that 1 is added to the less-significant address values during data writing and reading in the column direction. (For example, when i ($0 \leq i \leq 7$) is the less-significant address value applied to the memory $m_1$, a less-significant address value given by the remainder of division of $(i+j-1)$ by 8 is applied to a memory $m_j$. The same applies also to the reading of data with a data reduction rate of $\frac{1}{2}$. Thus, in the proposed method, the addresses applied to the memories must be converted by processing in the manner above described. Therefore, the prior art method is defective in that the scale of the address conversion processing circuit increases in proportion to the number N of the memories.

SUMMARY OF THE INVENTION

It is a primary object of the present invention to provide a data storage apparatus which includes independently operable $N=2^{n1}$ memories, in which data can be written and read in bit-parallel relation of N bits in both the column direction and the row direction, in which data reduced with a data reduction rate of an exponential power of 2 can also be read in bit-parallel relation of N bits in both the row direction and the column direction, and in which the mode of processing for conversion of the addresses applied to the memories is simplified.

The present invention which attains the above object provides a data storage apparatus which includes, when the number of data to be handled in parallel is $N=2^{n1}$ and the maximum data reduction rate during data reading is $2^{n2}$, a memory circuit including independently operable $2^{n1}$ memories $m_1, m_2, \ldots, m_{2^{n1}}$; $n_1$ address inputs $a_0, a_1, \ldots, a_{n_1-i}$ connected to each of the memories in such a relation that common address inputs $a_l$ are connected to memories $m_{2l+1, i-2^l-j}$ ($0 \leq l \leq n_1-1$, $1 \leq i \leq 2^{n1-1-l}$, $0 \leq j \leq 2^l-1$) and common address inputs $a_l$ are connected to memories $m_{2l+1, i-j}$; $n_2$ address inputs $b_0, b_1, \ldots, b_{n^2-1}$ connected to the memories in such a relation that common address inputs $b_s$ are connected to memories $m_{2t+1, p-2t-q}$ ($0 \leq s \leq n_2-1$, $1 \leq p \leq 2^{n1-1+t}$, $0 \leq q \leq 2^t-1$, t: remainder of division of s by $n_1$) and common address inputs $b_s$ are connected to memories $m_{2t-1, p-q}$; $n_2$ address inputs $c_0, c_1, \ldots, c_{n2-1}$ connected to the memories in such a relation that common address inputs $c_s$ are connected to the memories $m_{2t+1, p-2t-q}$ and common address inputs $c_s$ are connected to the memories $m_{2t-1, p-q}$, so that address values corresponding to the positions of data during writing and reading are applied to the memories. For the purpose of storing data in the memories, a block composed of data of $2^{n1+n2} \times 2^{n1+n2}$ bits is divided into groups each including $2^{n1}$ bits in the row direction and column direction respectively to provide $2^{n2} \times 2^{n2}$ subblocks each of which is composed of data of $2^{n1} \times 2^{n1}$ bits, and the input data of $2^{n1}$ bits in the row direction (or column direction) of each of the subblocks are permutated under sequential correspondence between the positions of the input data in the sub-block and the row (column) numbers of the input data in the sub-block, such permutated data being allocated to be stored in the memories.

Thus, the present invention provides the following meritorious effects:

(1) In a memory circuit including independentntly operable $2^{n1}$ memories $m_1, m_2, \ldots, m_{2n1}$ for storing permutated input data, $n_1$ address inputs $a_0, a_1, \ldots, a_{n1-1}$ are connected to each of the $2^{n1}$ memories in such a relation that common address inputs $a_l$ to memories $m_{2l+1, i-2l-j}$ ($0 \leq 1 \leq n_1-1$, $1 \leq i \leq 2^{n1-1-l}$, $0 \leq j \leq 2^l-1$) apply an address value $u_l$ and common address inputs $a_l$ to memories $m_{2l+1, i-j}$ apply an address value $v_l$; $n_2$ address inputs $b_0, b_1, \ldots, b_{n2-1}$ are connected to each of the $2^{n1}$ memories in such a relation that common address inputs $b_s$ to memories $m_{2t+1, p-2t-q}$ ($0 \leq s \leq n_2-1$, $1 \leq p \leq 2^{n1-1-t}$, $0 \leq q \leq 2^t-1$, t: remainder of division of s by $n_1$) apply an address value $x_s$ and common address inputs $b_s$ to memories $m_{2t+1, p-q}$ apply an address value $y_s$; and $n_2$ address inputs $c_0, c_1, \ldots, c_{n2-1}$ are connected to each of the $2^{n1}$ memories in such a relation that common address inputs $c_s$ to the memories $m_{2t+1, p-2t-q}$ apply an address value $w_s$ and common address inputs $c_s$ to the memories $m_{2t+1, p-q}$ apply an address value $z_s$. In the present invention, depending on whether the address values are applied to the memories from the row direction or column direction and depending on the rate of reduction of the input data, the address values $u_l$ and $v_l$, $x_s$ and $y_s$, and $w_s$ and $z_s$ ($0 \leq l \leq n_1 - 1$, $0 \leq s \leq n_2 - 1$) are controlled to be the same as or an inverted equivalent of the other respectively, so that management or processing of the addresses is facilitated.

(2) Even when the number $N = 2^{n_1}$ of data handled in parallel increases, the circuit scale required for the address management or processing increases merely in proportion to $n_1$ ($= \log_2 N$).

(3) Even when the maximum data reduction rate of $\frac{1}{2}n_2$ increases, the circuit scale required for the address management or processing increases merely in proportion to $2n_2$.

(4) Since an inverse permutation of a permutation $P_k$ ($0 \leq k \leq n_1 - 1$) for permutating data is also $P_k$, a data permutation circuit for data writing purpose can be designed to be the same as a data permutation circuit for data reading purpose.

BRIEF DESCRIPTION OF THE DRAWINGS

FIG. 1 shows a block composed of $16 \times 16$ bits of numbered data.

FIG. 2 shows a prior art manner of allocation of such data to memories.

FIG. 3 shows address values applied to the individual memories in the column direction for allocation of the data to the memories in the prior art manner.

FIG. 9 shows the correspondence between the control signals $s_0$ to $s_2$ shown in FIG. 6 and the permutation $P_k$ ($0 \leq k \leq 7$) and shows also the data permutated by application of the permutation $P_k$.

FIG. 14(I) and 14(II) show how the data in the block shown in FIG. 4 are allocated to the memories.

FIG. 15 shows address values applied to the memories during handling of the data in the column direction.

FIG. 16 shows address values applied to the memories when the data reduced with a reduction rate of $\frac{1}{2}$ are read out in the row direction.

FIG. 17 shows the data reduced with the reduction rate of $\frac{1}{2}$ and read out in the column direction and shows also the data permutated in the data permutation circuit 3.

FIG. 18 shows address values applied to the memories when the odd-numbered data in the individual columns are extracted to read out the data of 8 bits reduced with the reduction rate of $\frac{1}{2}$.

DESCRIPTION OF THE PREFERRED EMBODIMENTS

Figures 4, 5:
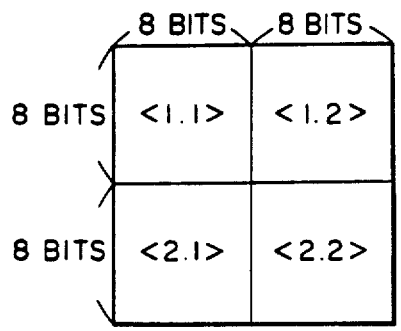
FIG. 4 shows division of a block composed of $16 \times 16$ bits of data into numbered four sub-blocks.
FIG. 5 shows numbered data in each of the sub-blocks.

Preferred embodiments of the present invention will now be described in detail. As in the prior art case, it is supposed that the number N of bits handled in parallel is $N = 8$, and the rate of data reduction is up to $\frac{1}{2}$. A block composed of $16 \times 16$ bits of data is divided into four sub-blocks each of which is composed of $8 \times 8$ bits of data. FIG. 4 shows how these sub-blocks are numbered, and FIG. 5 shows how the data in each of the sub-blocks composed of $8 \times 8$ bits are numbered.

Figure 6:
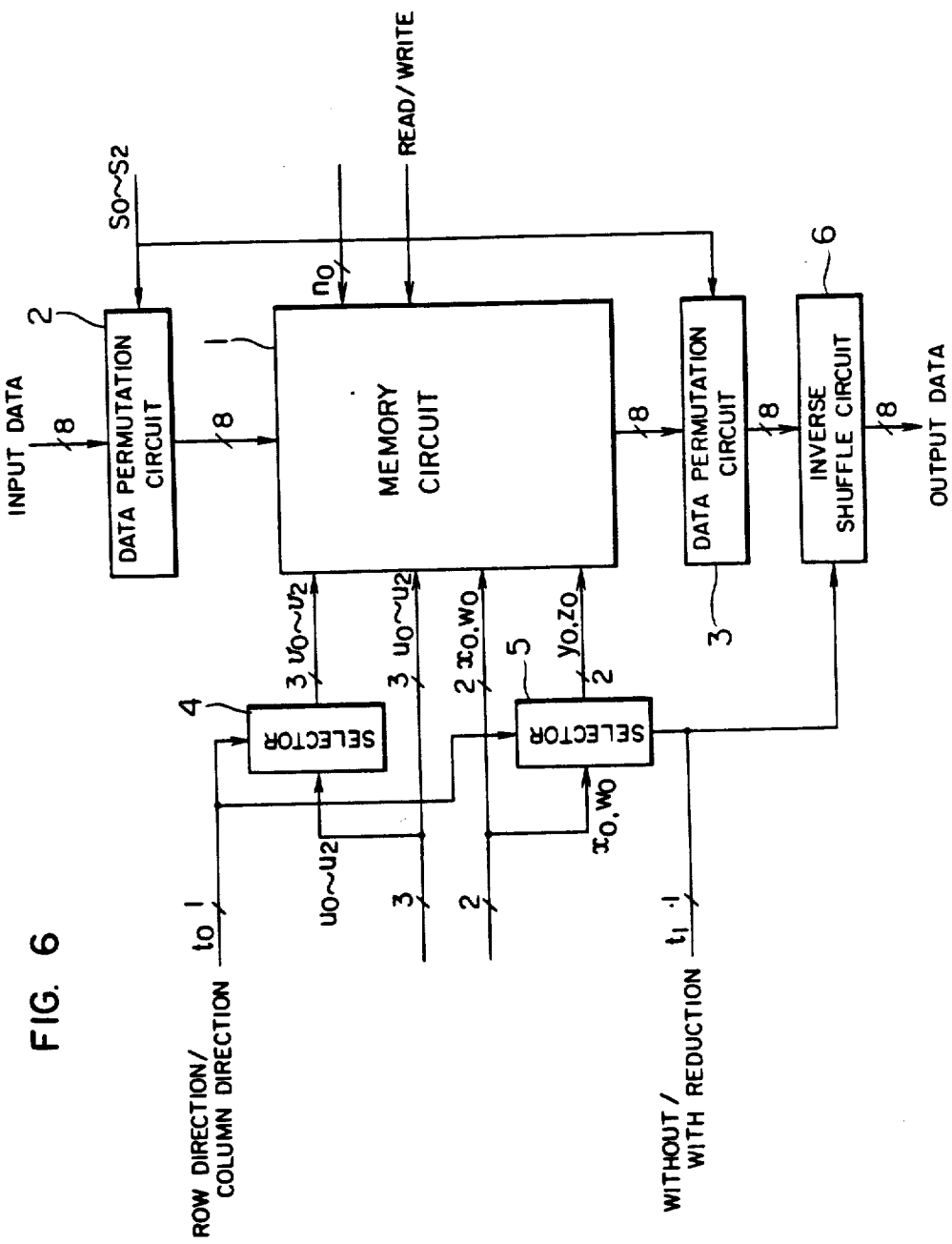
FIG. 6 is a block diagram of a preferred embodiment of the data storage apparatus of the present invention.

FIG. 6 is a block diagram of an embodiment of the data storage apparatus according to the present invention.

Referring to FIG. 6, the data storage apparatus comprises a memory circuit 1 including eight memories $m_1$ to $m_8$ which are operable independently of one another.

Figure 7:
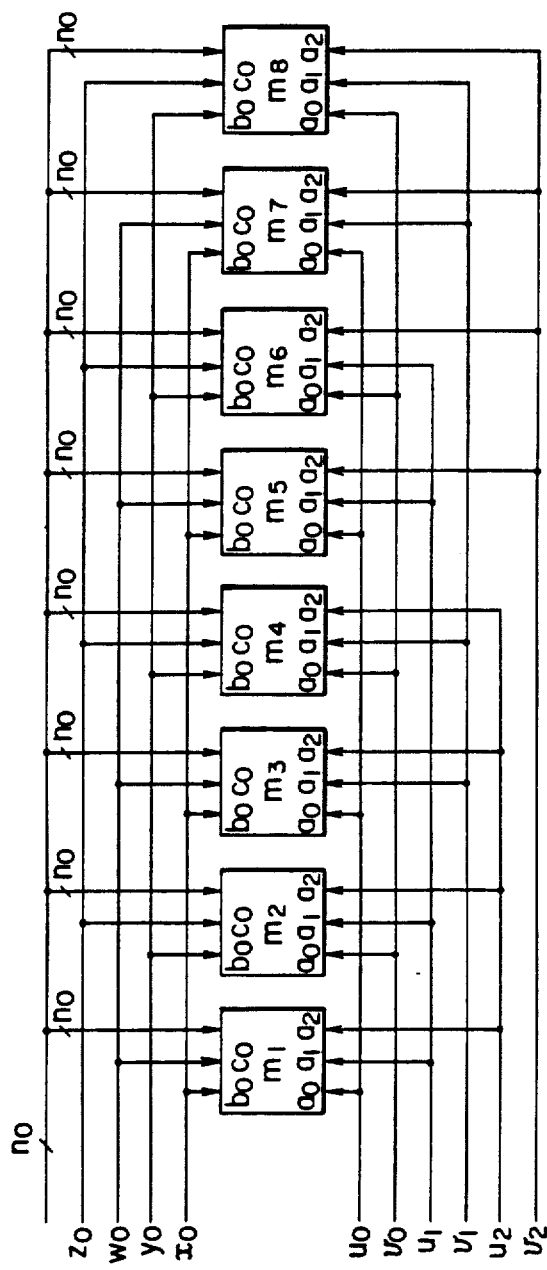
FIG. 7 shows in detail the structure of the memory circuit shown in FIG. 6.

Each of the memories $m_1$ to $m_8$ constituting the memory circuit 1 has three address inputs $a_0$, $a_1$ and $a_2$. The connection is such that the address inputs $a_0$ specifying an address value $u_0$ are connected in common to the memories $m_1$, $m_3$, $m_5$ and $m_7$; the address inputs $a_0$ specifying an address value $v_0$ are connected in common to the memories $m_2$, $m_4$, $m_6$ and $m_8$; the address inputs $a_1$ specifying an address value $u_1$ are connected in common to the memories $m_1$, $m_2$, $m_5$ and $m_6$; the address inputs $a_1$ specifying an address value $v_1$ are connected in common to the memories $m_3$, $m_4$, $m_7$ and $m_8$; the address inputs $a_2$ specifying an address value $u_2$ are connected in common to the memories $m_1$, $m_2$, $m_3$ and $m_4$; and the address inputs $a_2$ specifying an address value $v_2$ are connected in common to the memories $m_5$, $m_6$, $m_7$ and $m_8$. Each of the memories $m_2$ to $m_8$ has another address input $b_0$. The connection is such that the address inputs $b_0$ specifying an address value $x_0$ are connected in common to the memories $m_1$, $m_3$, $m_5$ and $m_7$; and the address inputs $b_0$ specifying an address value $y_0$ are connected in common to the memories $m_2$, $m_4$, $m_6$ and $m_8$. Each of the memories $m_1$ to $m_8$ has another address input $c_0$. The connection is such that the address inputs $c_0$ specifying an address value $w_0$ are connected in common to the memories $m_1$, $m_3$, $m_5$ and $m_7$; and the address inputs $c_0$ specifying an address value $z_0$ are connected in common to the memories $m_2$, $m_4$, $m_6$ and $m_8$. Remaining address inputs $n_0$ are connected in common to all of the memories $m_1$ to $m_8$. FIG. 7 shows in detail the address input connections in the memory circuit 1.

Figures 8A, 8B:
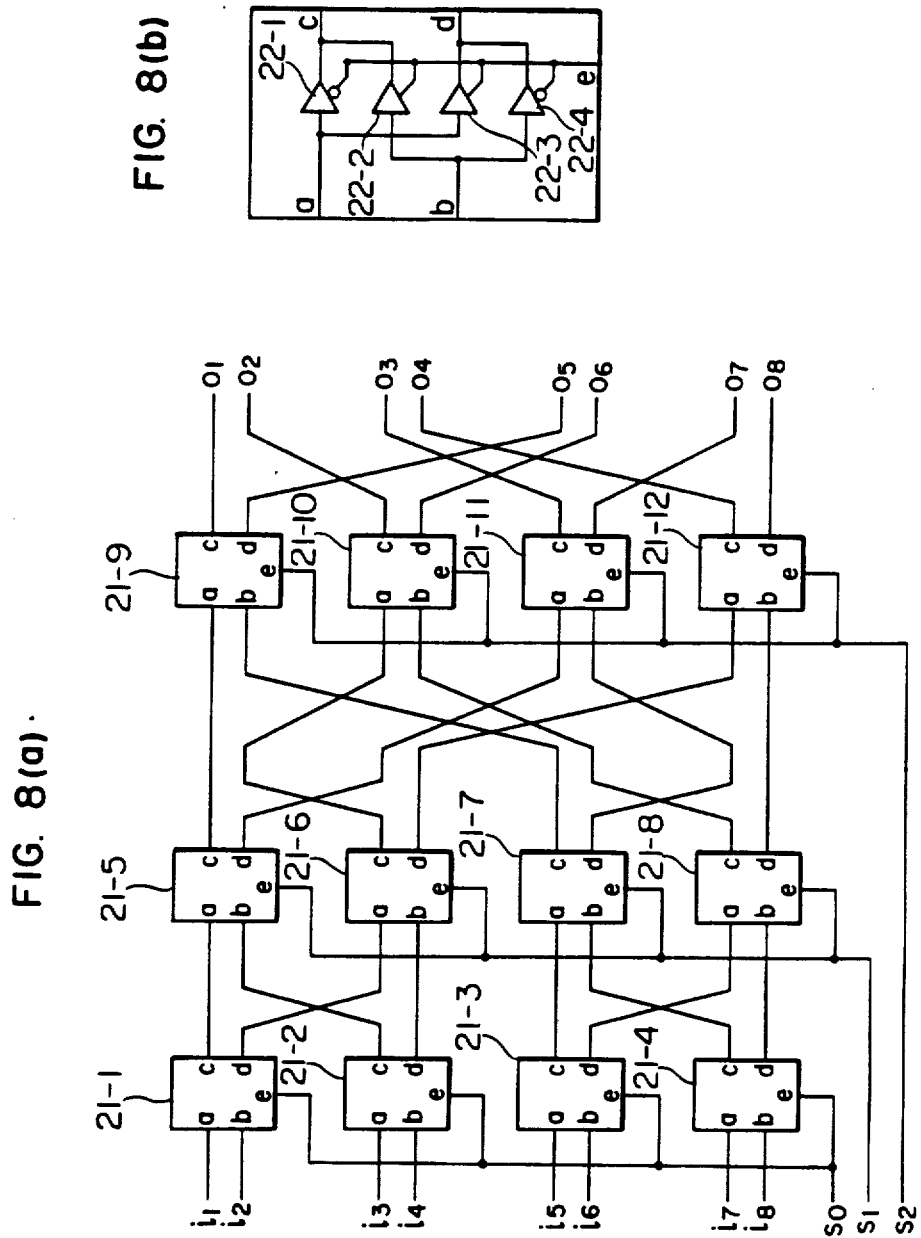
FIG. 8(a) and 8(b) shown in detail the structure of the data permutation circuit 2 (3) shown in FIG. 6.

Data permutation circuits 2 and 3 make permutation of data. Permutation of the 1st and 2nd data, the 3rd and 4th data, the 5th and 6th data, and the 7th and 8th data in the orderly arranged 8 data is called a permutation $P_1$. Permutation of the 1st and 3rd data, the 2nd and 4th data, the 5th and 7th data, and the 6th and 8th data is called a permutation $P_2$. Permutation of the 1st and 5th data, the 2nd and 6th data, the 3rd and 7th data, and the 4th and 8th data is called a permutation $P_4$. Making the permutation $P_2$ after attainment of the permutation $P_1$ is called a composed permutation $P_3$. Making the permutation $P_4$ after attainment of the permutation $P_1$ is also called a composed permutation $P_5$. Making the permutation $P_4$ after attainment of the permutation $P_2$ is also called a composed permutation $P_6$. Making the permutation $P_4$ after attainment of the permutation $P_3$ is also called a composed permutation $P_7$. Making no data permutation is called an identity permutation $P_0$. Under control of external control signals $s_0$ to $s_2$, the data permutation circuits 2 and 3 execute a selected one of the 5 permutations $P_0$ to $P_7$ for the desired permutation of the data. FIG. 8(a) shows in detail the structure of each of the data permutation circuits 2 and 3 composed of unit cells, and FIG. 8(b) shows in detail the structure of each unit cell. FIG. 9 shows the correspondence between the control signals $s_0$ to $s_2$ and the permutations $P_k$ ($0 \leq k \leq 7$) executed by the data permutation circuits 2 and 3 and shows also the results of permutation of the data which have been initially arranged orderly from 1 to 8.

Referring to FIG. 8(a), the control signals $s_0$ to $s_2$ are selectively applied to control signal input terminals e of the cells 21—1 to 21—12. Depending on the level of the control signals $s_0$ to $s_2$, an input data applied to a terminal a appears at a terminal c of a selected cell, and an input data applied to a terminal b appears at a terminal d of the selected cell, or the input data applied to the terminal b appears at the terminal c of the selected cell and the input data applied to the terminal a appears at the terminal d of the selected cell.

Referring to FIG. 8(b), each of the cells includes buffer gates 22—1 to 22—4. When the control signal of "L" level is applied to the control signal input terminal e of the buffer gate 22—1, an input data applied to the terminal a appears at the terminal c. while, when the control signal of "H" level is applied, no output appears from the buffer gate 22—1. Also, when the control signal of "H" level is applied to the control signal input terminal e of the buffer gate 22-2, an input data applied to the terminal b appears at the terminal c, while, when the control signal of "L" level is applied, no output appears from the buffer gate 22—2. The buffer gates 22—3 and 22—4 are similar to the buffer gates 22—2 and 22—1 respectively in their operation mode.

When, for example, all the control signals $s_0$ to $s_2$ are in their "L" level in FIG. 8(a), that is, when $s_0 = s_1 = s_2 = 0$ as shown in FIG. 9, a data train $\{1, 2, 3, 4, 5, 6, 7, 8\}$ applied to the input terminals $i_1$ to $i_8$ appears intact as the original data train $\{1, 2, 3, 4, 5, 6, 7, 8\}$ at the output terminals $O_1$ to $O_8$ in FIG. 8(a). On the other hand, when $s_2 = 1$ and $s_0 = S_1 = 0$, the data train $\{1, 2, 3, 4, 5, 6, 7, 8\}$ applied to the input terminals $i_1$ to $i_8$ appear as a permutated data train $\{5, 6, 7, 8, 1, 2, 3, 4\}$ at the output terminals $o_1$ to $o_8$.

Selectors 4 and 5 change over or select the address inputs applied to the memory circuit 1. Depending on whether data to be handled are applied from the row direction or column direction, the selector 4 selects the address values of $v_0 = u_0$, $v_1 = u_1$ and $v_2 = u_2$; or $v_0 = \overline{u_0}$, $v_1 = \overline{u_1}$ and $v_2 \overline{u_2}$ and applies such address values to the memories $m_1$ to $m_8$ shown in FIG. 7.

Figure 10:
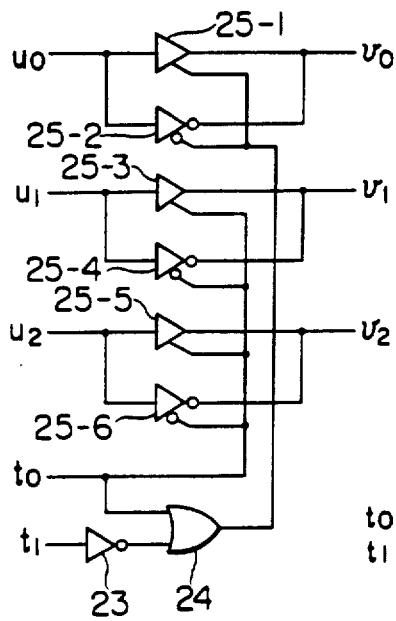
FIG. 10 shows in detail the structure of the selector 4 shown in FIG. 6.

FIG. 10 shows in detail the structure of the selector 4. Referring to FIG. 10, the selector 4 includes an inverter gate 23, an OR gate 24 and buffer gates 25—1 to 25—6. A control signal $t_1$ is applied through the inverter gate 23 to the OR gate 24. When the OR gate 24 generates its output signal of "H" level, an input signal $u_0$ applied to the buffer gate 25—1 appears as an output signal $v_0$, while, when the output of the OR gate 24 is in its "L" level, no output appears from the buffer gate 25—1. On the other hand, when the OR gate 24 generates its output signal of "L" level, an input signal $u_0$ applied to the buffer gate 25—2 appears as an inverted output signal $v_0 = \overline{u_0}$, while, when the output of the OR gate 24 is in its "H" level, no output appears from the buffer gate 25—2.

Another control signal $t_0$ is applied directly to the OR gate 24 and buffer gates 25—3 to 25—6. When the control signal $t_0$ is in its "H" level, input signals $u_1$ and $u_2$ applied to the buffer gates 25—3 and 25—5 appear as output signals $v_1$ and $v_2$ respectively, while, when the control signal $t_0$ is in its "L" level, no outputs appear from these buffer gates 25—3 and 25—5. On the other hand, when the control signal $t_0$ is in its "L" level, input signals $u_1$ and $u_2$ applied to the buffer gates 25—4 and 25—6 appear as inverted output signals $v_1 = \overline{u_1}$ and $v_2 = \overline{u_2}$ respectively, while, when the control signal $t_0$ is in its "H" level, no outputs appear from these buffer gates 25—4 and 25—6.

Depending on whether reduced data are to be handled or data to be handled are applied from the row direction or column direction, the selector 5 selects the address values of $y_0 = x_0$ and $z_0 = w_0$; or $y_0 = \overline{x_0}$ and $z_0 = w_0$; or $y_0 = x_0$ and $z_0 = \overline{w_0}$ and applies such address values to the memories $m_1$ to $m_8$ shown in FIG. 7.

Figure 11:
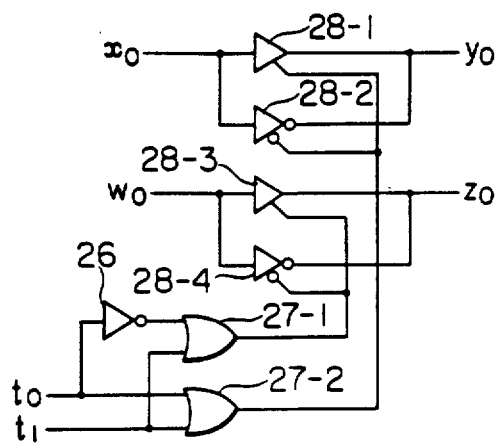
FIG. 11 shows in detail the structure of the selector 5 shown in FIG. 6.

FIG. 11 shows in detail the structure of the selector 5. Referring to FIG. 11, the selector 5 includes an inverter gate 26, OR gates 27—1, 27—2 and buffer gates 28—1 to 28—4. The control signal $t_0$ is applied through the inverter gate 26 to the OR gate 27—1 and directly to the OR gate 27—2, while the control signal tl is applied directly to the OR gates 27—1 and 27—2. When the OR gate 27—2 generates its output signal of "H" level, an input signal $x_0$ applied to the buffer gate 28—1 appears as an output signal $y_0$, while, when the output of the OR gate 27—2 is in its "L" level, no output appears from the buffer gate 28—1. On the other hand, when the OR gate 27—2 generates its output signal of "L" level, an input signal $x_0$ applied to the buffer gate 28—2 appears as an inverted output signal $y_0 = \overline{x_0}$, while, when the output of the OR gate 27—2 is in its "H" level, no output appears from the buffer gate 28—2. The buffer gates 28—3 and 28—4 are similar in operation to the buffer gates 28—1 and 28—2 respectively.

Figure 12:
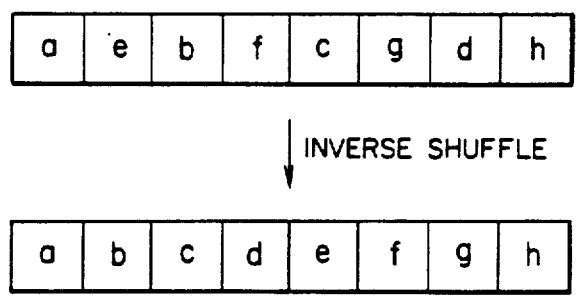
FIG. 12 shows inverse-shuffled data.

When data reduced to ½ of original data are read out, 8 data are arranged in a shuffled order. An inverse shuffle circuit 6 is provided so that such 8 data arranged in the shuffled order can be re-arranged into the original order. In the read mode with data reduction, inverse-shuffled 8 data as shown in FIG. 12 appear from the inverse shuffle circuit 6. On the other hand, in the read mode without data reduction, non-inverse-shuffled 8 data appear at the output of the inverse shuffle circuit 6.

Figure 13:
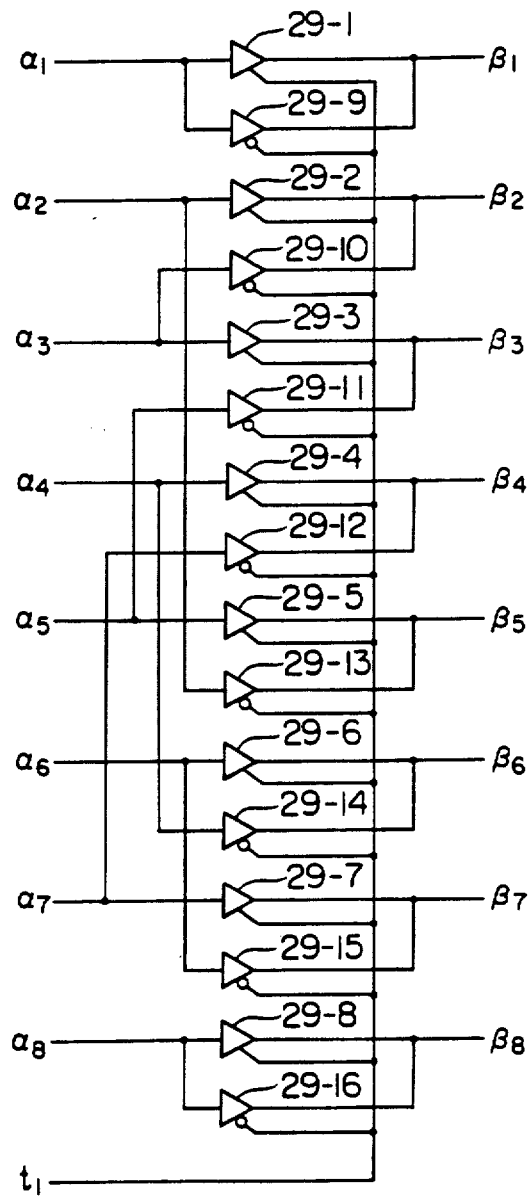
FIG. 13 shows in detail the structure of the inverse shuffle circuit shown in FIG. 6.

FIG. 13 shows in detail the structure of the inverse shuffle circuit 6. Referring to FIG. 13, the inverse shuffle circuit 6 includes buffer gates 29—1 to 29—16. When the control signal tl is in its "H" level, an input signal $\alpha_1$ applied to the buffer gate 29—1 appears as an output signal $\beta_1$, while, when the control signal $t_1$ is in its "L" level, no output appears from the buffer gate 29—1. On the other hand, when the control signal $t_1$ is in its "L" level, an input signal $\alpha_1$ applied to the buffer gate 29—9 appears as an output signal $\beta_1$, while, when the control signal $t_1$ is in its "H" level, no output appears from the buffer gate 29—9. Similarly, when the control signal t is in its "H" level, an input signal $\alpha_2$ applied to the buffer gate 29—2 appears as an output signal $\beta_2$, while, when the control signal $t_1$ is in its "L" level, no output appears from the buffer gate 29—2. On the other hand, when the control signal $t_1$ is in its "L" level, an input signal $\alpha_3$ applied to the buffer gate 29—10 appears as an output signal $\beta_2$, while, when the control signal $t_1$ is in its "H" level, no output appears from the buffer gate 29—10. The buffer gates 29—3 to 29—8 are similar in operation to the buffer gates 29—1 and 29—2. The buffer gates 29—11 to 29—16 are similar in operation to the buffer gates 29—9 and 29—10.

For example, when the control signal $t_1$ is in its "H" level, and the input signal train $\{\alpha_1, \alpha_2, \alpha_3, \alpha_4, \alpha_5, \alpha_6, \alpha_7, \alpha_8\}$ applied to the inverse shuffle circuit 6 is represented by $\{a, e, b, f, c, g, d, h\}$, the output signal train $\{\beta_1, \beta_2, \beta_3, \beta_4, \beta_5, \beta_6, \beta_7, \beta_8\}$ is represented by $\{a, e, b, f, c, g, d, h\}$. On the other hand, when the control signal $t_1$ is in its "L" level, and the input signal train $\{\beta_1, \alpha_2, \alpha_3, \alpha_4, \alpha_5, \alpha_6, \alpha_7, \alpha_8\}$ is represented by $\{a, e, b, f, c, g, d, h\}$, the output signal train $\{\beta_1, \beta_2, \beta_3, \beta_4, \beta_5, \beta_6, \beta_7, \beta_8\}$ is now represented by $\{a, b, c, d, e, f, g, h\}$ as shown in FIG. 12.

Suppose now that data of 8 bits in the row direction of each sub-block composed of 8×8 bits are arranged in order from the 1st to the 8th column, and data of 8 bits in the column direction are also arranged in order from the 1st to the 8th row. How to write data from the row direction in the block in such a case will be first described.

Input data of 8 bits are permutated in the data permutation circuit 2 depending on the positions of the data in the sub-blocks and the row numbers in the sub-blocks. The control signals $s_0$ to $s_2$ are applied to the data permutation circuit 2 so that, for the data belonging to the sub-blocks $<1, 1>$ and $<2, 2>$, the input data are permutated by making sequential correspondence between the aforementioned permutations $P_0, P_1, P_2, \ldots, P_7$ orderly arranged from $P_0$ and the row numbers of the input data in the sub-blocks, while, for the data belonging to the sub-blocks $<1, 2>$ and $<2, 1>$, the input data are permutated by making sequential correspondence between the re-arranged permutations $P_1, P_0, P_3, P_2, P_5, P_4, P_7, P_6$ obtained by applying the permutation $P_1$ to the permutations $P_0, P_1, P_2, \ldots, P_7$ orderly arranged from $P_0$ and the row numbers of the input data in the sub-blocks. The data permutated in the data permutation circuit 2 are stored in the memories $m_1$ to $m_8$ in the permutated order.

The address inputs $n_0$ connected in common to all of the memories $m_1$ to $m_8$ specify the block and provide a fixed address value of data in the block. The address inputs $a_0$ to $a_2$ provide the address values $u_0$, $u_1$ and $u_2$ respectively. The address values $u_0$ to $u_2$ are applied to the memory circuit 1 to specify that an address value given by $u_2 u_1 u_0 = i-1$ (a decimal representation of $u_2 u_1 u_0$) corresponds to data in an i-th row in the sub-blocks. Further, as each of the address values $v_0$ to $v_2$, $v_j = u_j (0 \leq j \leq 2)$ is supplied to the memory circuit 1 by applying the control signal $t_0$ of "H" level to the selector 4.

The address inputs $b_0$ and $c_0$ provide address values $x_0$ and $w_0$ respectively. Address values applied to the memory circuit 1 are $x_0=0$, $w_0=0$ for the sub-block $<1, 1>$; $x_0=1$, $w_0=0$ for the sub-block $<1, 2>$; $x_0=0$, $w_0=1$ for the sub-block $<2, 1>$; and $x_0=1$, $w_0=1$ for the sub-block $<2, 2>$. Further, as the address values $y_0$ and $z_0$, $y_0=x_0$ and $z_0=w_0$ are applied to the memory circuit 1 by applying the control signal $t_1$ of "H" level to the selector 5.

The data in the block numbered in the manner shown in FIGS. 4 and 5 are stored in the memories $m_1$ to $m_8$ in a state as shown in FIG. 14. The addresses shown in FIG. 14 are specified by the less-significant 5 bits provided by the address inputs $c_0$, $b_0$, $a_2$, $a_1$ and $a_0$.

In the case of data writing from the column direction, input data of 8 bits are permutated in the data permutation circuit 2 depending on the positions of the data in the sub-blocks and the column numbers in the sub-blocks. As in the case of data writing from the row direction, the control signals $s_0$ to $s_2$ are applied to the data permutation circuit 2 so that, for the data belonging to the sub-blocks $<1, 1>$ and $<2, 2>$, the input data are permutated by making sequential correspondence between the aforementioned permutations $P_0, P_1, P_2, \ldots, P_7$ orderly arranged from $P_0$ and the column numbers of the input data in the sub-blocks, while, for the data belonging to the sub-blocks $<1, 2>$ and $<2, 1>$, the input data are permutated by making sequential correspondence between the permutations $P_1, P_0, P_3, P_2, P_5, P_4, P_7, P_6$ attained by applying the permutation $P_1$ to the permutations $P_0, P_1, P_2, \ldots, P_7$ orderly arranged fro $P_0$ and the column numbers of the input data in the sub-blocks. The data permutated in the data permutation circuit 2 are stored in the memories $m_1$ to $m_8$ in the permutated order. The address values $u_0$ to $u_2$ provided by the address inputs $a_0$ to $a_2$ are applied to the memory circuit 1 to specify that an address value given by $u_2 u_1 u_0 = i-1$ (a decimal representation of $u_2 u_1 u_0$) corresponds to data in an i-th column in the sub-blocks $<1, 1>$ and $<2, 2>$. In the case of the data belonging to the sub-blocks $<1, 2>$ and $<2, 1>$, address values are permutated in the order of 1, 0, 3, 2, 5, 4, 7, 6 by applying the aforementioned permutation $P_1$ to 0, 1, 2, . . . 7 which are orderly arranged from 0 and which indicate decimal representations of $u_2 u_1 u_0$. Such address values making sequential correspondence with the column numbers of the input data in the sub-blocks are applied to the memory circuit 1. Further, as each of the address values $v_0$ to $v_2$, $v_j = \overline{u_j}(0 \leq j \leq 2)$ is applied to the memory circuit 1 by applying the control signal $t_0$ of "L" level to the selector 4. The other address values are the same as those described with reference to the case of data writing from the row direction. FIG. 15 shows the relation between the column numbers in the sub-blocks $<1, 1°$ to $<2, 2>$ and the corresponding address values $c_0 b_0 a_2 a_1 a_0$ (decimal representations of $c_0 b_0 a_2 a_1 a_0$) applied to the memories $m_1$ to $m_8$. Thus, when the data are stored in the memories in the manner above described in the case of data writing from the column direction, the data can be allocated and stored in the memories in entirely the same manner as the data allocation and storage shown in FIG. 14 representing the case of data writing from the row direction.

Description will now be directed to reading of data from the memories $m_1$ to $m_8$. Suppose first the case where data of 8 bits arranged in the row direction are read out without any data reduction or in a standard mode. Since the data in the block shown in FIGS. 4 and 5 are stored as shown in FIG. 14, the manner of applying the address values to the memories $m_1$ to $m_8$ is the same as that of data writing from the row direction, thereby reading out the data from the memories $m_1$ to $m_8$.

In the data read out from the memories $m_1$ to $m_8$, the data arrangement has been changed as a result of data permutation depending on the sub-block number and the row number of the data in the sub-block. Therefore, the data are permutated into the original order in the data permutation circuit 3. When the data permutated according to the aforementioned permutation $P_k$ ($0 \leq k \leq 7$) are subjected to the same permutation $P_k$, the data arrangement is restored to the original arrangement ($P_k \cdot P_k = P_0$). Thus, the control signals $s_0$ to $s_2$ are applied to the data permutation circuit 3 so that, for the data belonging to the sub-blocks <1, 1> and <2, 2°, sequential correspondence between the permutations $P_0, P_1, P_2, \ldots, P_7$ orderly arranged from $P_0$ and the row numbers of the read-out data in the sub-blocks can permutate the data into the original arrangement, while, for the data belonging to the sub-blocks <1, 2° and <2, 1>, sequential correspondence between the permutations $P_1, P_0, P_3, P_2, P_5, P_4, P_7, P_6$ arranged in the above order and the row numbers of the read-out data in the sub-blocks can permutate the data into the original arrangement. The output data from the data permutation circuit 3 appear intact through the inverse shuffle circuit 6.

Suppose then the case where data of 8 bits arranged in the column direction are read out without any data reduction or in a standard mode. The manner of applying address values to the memories $m_1$ to $m_8$ is to the same as that of data writing from the column direction, thereby reading out the data from the memories $m_1$ to $m_8$.

In the data read out from the memories $m_1$ to $m_8$, the data arrangement has been changed as a result of data permutation depending on the sub-block number and the column number of the data in the sub-block. Therefore, the data are permutated into the original order in the data permutation circuit 3. When the data permutated according to the aforementioned permutation $P_k$ ($0 \leq k \leq 7$) are subjected to the same permutation $P_k$, the data arrangement is restored to the original arrangement ($P_k \cdot P_k = P_0$). Thus, the control signals $s_0$ to $s_2$ are applied to the data permutation circuit 3 so that, for the data belonging to the sub-blocks <1, 1> and <2, 2>, sequential correspondence between the permutations $P_0, P_1, P_2, \ldots, P_7$ orderly arranged from $P_0$ and the column numbers of the read-out data in the sub-blocks can permutate the data into the original arrangement, while, for the data belonging to the subblocks <1, 2> and <2, 1°, sequential correspondence between the permutations $P_1, P_0, P_3, P_2, P_5, P_4, P_7, P_6$ arranged in the above order and the column numbers of the read-out data in the sub-blocks can permutate the data into the original arrangement. The output data from the data permutation circuit 3 appear intact through the inverse shuffle circuit 6.

Suppose then the case where data of 8 bits arranged in the row direction are read out with a data reduction rate of $\frac{1}{2}$, that is, for example, the oddnumbered data in each row are read out. The address inputs $n_0$ connected in common to all of the memories $m_1$ to $m_8$ specify the block and provide a fixed address value in the block. The address values $u_0$ to $u_2$ provided by the address inputs $a_0$ to $a_2$ are applied to the memory circuit 1 to specify that an address value given by $u_2 u_1 u_0 = i_0$ (a decimal representation of $u_2 u_1 u_0$, $i_0$: remainder of division of $i-1$ by 8) corresponds to data in an i-th row ($1 \leq i \leq 16$) in the block. Further, as each of address values $v_0$ to $v_2$, $v_j = u_j$ ($0 \leq j \leq 2$) is supplied to the memory circuit 1, while applying the control signal $t_0$ of "H" level to the selector 4.

The address inputs $b_0$ and $c_0$ provide address values $x_0$ and $w_0$ respectively. Address values applied to the memory circuit 1 are $x_0 = 0$, $w_0 = 0$ for reading out the data in the odd-numbered rows between the 1st and 8th rows in the block; $x_0 = 1$, $w_0 = 0$ for reading out the data in the even-numbered rows between the 1st and 8th rows in the block; $x_0 = 1$, $w_0 = 1$ for reading out the data in the odd-numbered rows between the 9th and 16th rows in the block; and $x_0 = 0$, $w_0 = 1$ for reading out the data in the even-numbered rows between the 9th and 16th rows in the block. The control signal $t_0$ applied to the selector 5 is in its "H" level, since the control signal $t_0$ applied to the selector 4 is in its "H" level. As addresses values values $y_0$ and $z_0$, $y_0 = \overline{x_0}$ and $z_0 = w_0$ are applied to the memory circuit 1 while applying the control signal $t_1$ to "L" level. FIG. 16 shows the address values $c_0 b_0 a_2 a_1 a_0$ (decimal representations of $c_0 b_0 a_2 a_1 a_0$) applied to the memories $m_1$ to $m_8$ when the odd-numbered data in each row are extracted to read out data of 8 bits reduced with the data reduction rate of $\frac{1}{2}$.

Figure 17:
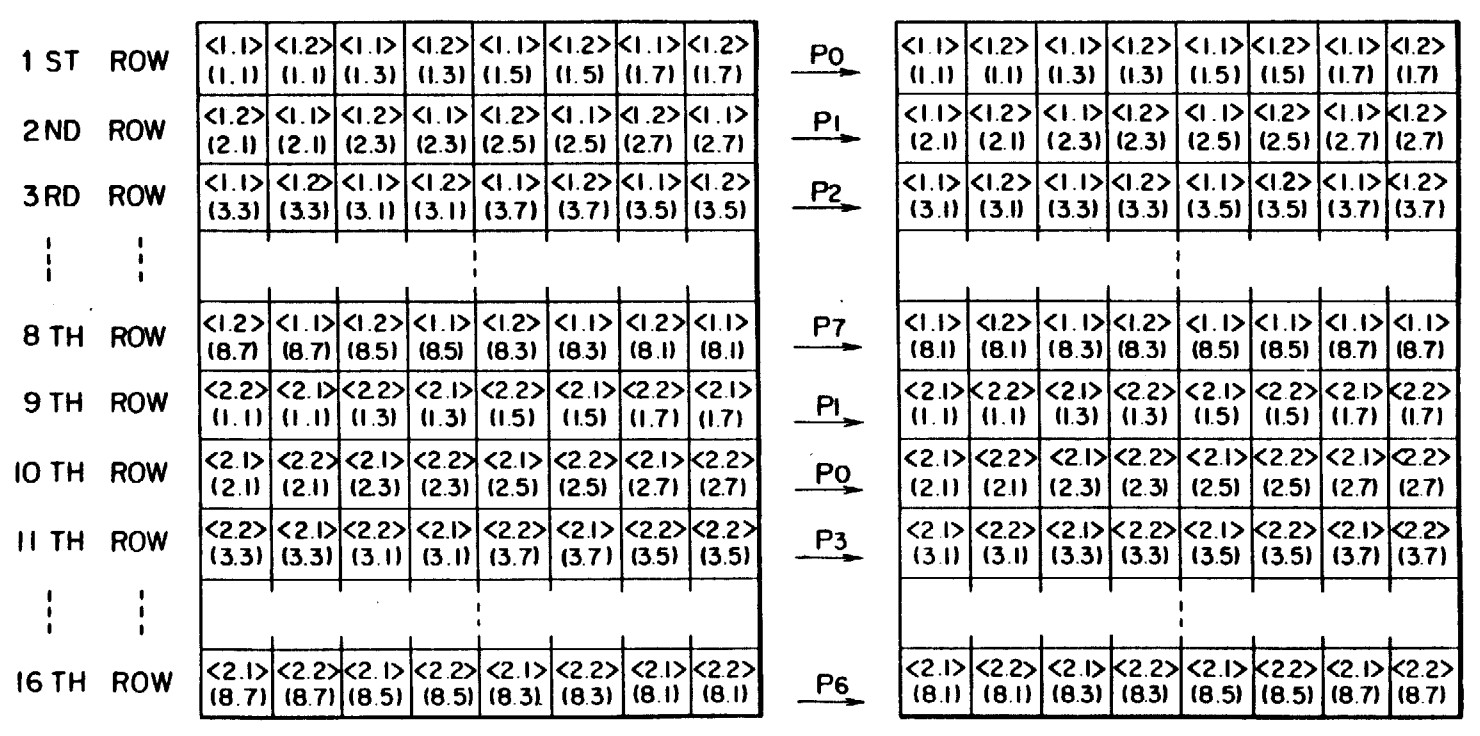

The data read out from the memories $m_1$ to $m_8$ are permutated in the data permutation circuit 3 according to the row number in the block. The control signals $s_0$ to $s_2$ are applied to the data permutation circuit 3 so that the 1st and 10th rows in the block shown in FIG. 16 correspond to the permutation $P_0$; the 2nd and 9th rows correspond to the permutation $P_1$; the 3rd and 12th rows correspond to the permutation $P_2$; the 4th and 11th rows correspond to the permutation $P_3$; the 5th and 14th rows correspond to the permutation $P_4$; the 6th and 13th rows correspond to the permutation $P_5$; the 7th and 16th rows correspond to the permutation $P_6$; and the 8th and 15th rows correspond to the permutation $P_7$. FIG. 17 shows the data of 8 bits provided as a result of extraction of the odd-numbered data in the individual rows, hence, as a result of reduction of the data with the data reduction rate of $\frac{1}{2}$ and shows also the data permutated in the data permutation circuit 3.

The control signal $t_1$ applied to the inverse shuffer circuit 6 is in the "L" level which is the same as that applied to the selector 5, and the output data from the inverse shuffle circuit 6 are inverse shuffled as shown in FIG. 12. In the manner described above, extracted odd-numbered data of 8 bits appear from the frame inverse shuffle circuit 6.

Suppose then the case where data of 8 bits arranged in the column direction are read out with a data reduction rate of $\frac{1}{2}$, that is, for example, the odd-numbered data in each column are read out. The address inputs $n_0$ connected in common to all of the memories $m_1$ to $m_8$ specify the block and provide a fixed address value in the block. The address values $u_0$ to $u_2$ provided by the address inputs $a_0$ to $a_2$ are applied to the memory circuit 1 to specify that an address value given by $u_2 u_1 u_0 = 2 * [(i-1)/2]$ (a decimal representation of $u_2 u_1 u_0$, [A]: a maximum integer not larger than A) corresponds to data in an i-th row ($1 \leq i \leq 16$) in the block. Further, as address values $v_0$ to $v_2$, $v_0 = u_0$, $v_1 = \overline{u_0}$ and $v_2 = \overline{u_2}$ are applied to the memory circuit 1 while applying the control signal $t_0$ of "L" level and control signal $t_1$ of "L" level to the selector 4.

The address inputs $b_0$ and $c_0$ provide address values $x_0$ and $w_0$ respectively. Address values applied to the memory circuit 1 are $x_0 = 0$, $w_0 = 0$ for reading out the data in the odd-numbered rows between the 1st and 8th rows in the block; $x_0 = 0$, $w_0 = 1$ for reading out the data in the even-numbered rows between the 1st and 8th rows in the block; $x_0 = 1$, $w_0 = 1$ for reading out the data in the odd-numbered rows between the 9th and 16th rows in the block; and $x_0 = 1$, $w_0 = 0$ for reading out the data in the even-numbered rows between the 9th and 16th rows in the block. The control signals $t_0$ of "L" level and $t_1$ to "L" level applied to the selector 4 are also applied to the seclector 5. As address values $y_0$ and $z_0$, $y_0 = x_0$ and $z_0 = w_0$ are applied to the memory circuit 1. FIG. 18 shows the address value $c_0 b_0 a_2 a_1 a_0$ (decimal representations of $c_0 b_0 a_2 a_1 a_0$) applied to the memories $m_1$ to $m_8$ when the odd-numbered data in each column are extracted to read out data of 8 bits reduced with the data reduction rate of $\frac{1}{2}$.

Figure 19:
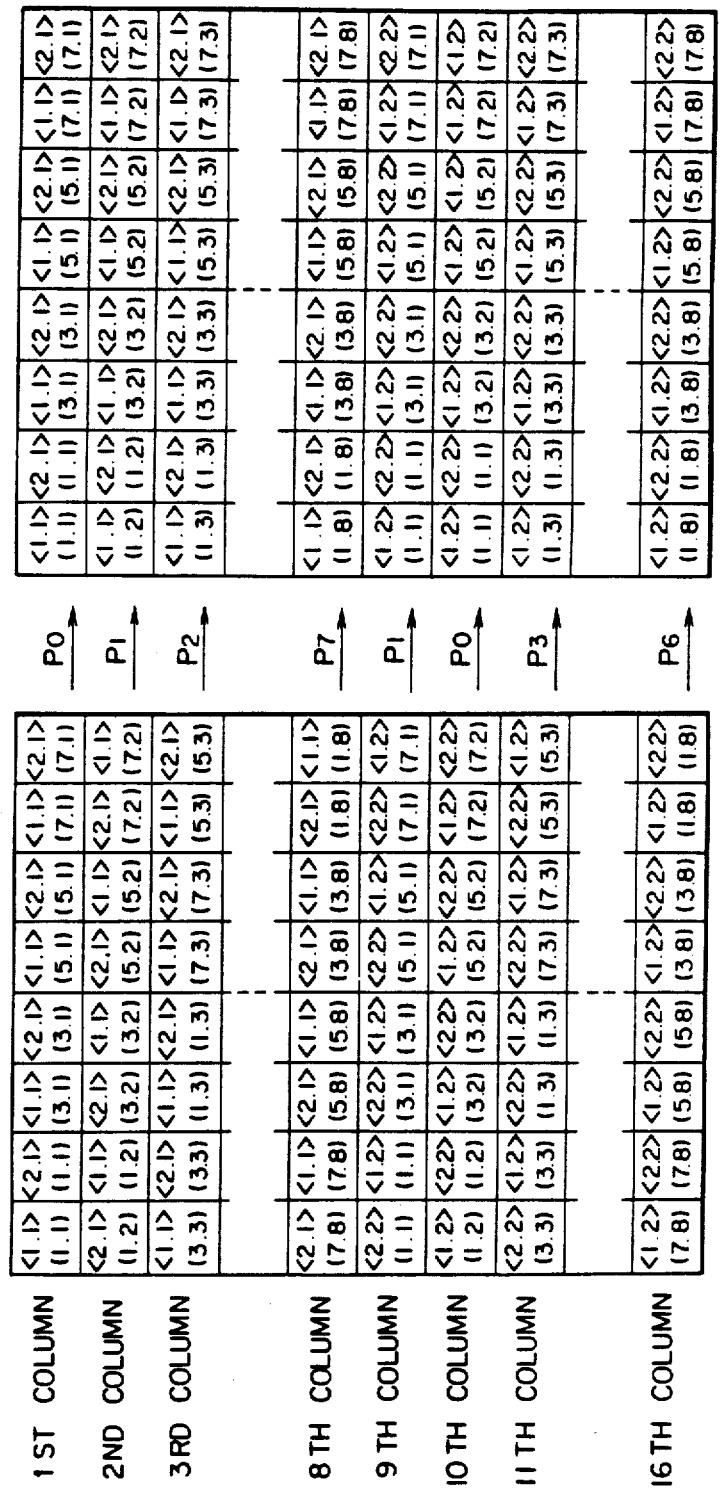
FIG. 19 shows the data of 8 bits obtained by extraction of the odd-numbered data in the individual columns to be reduced with the reduction rate of $\frac{1}{2}$ and shows also the data permutated in the data permutation circuit 3.

The data read out from the memories $m_1$ to $m_8$ are permutated in the data permutation circuit 3 according to the column number in the block. The control signals $s_0$ to $s_2$ are applied to the data permutation circuit 3 so that the 1st and 10th columns in the block shown in FIG. 18 correspond to the permutation $P_0$; the 2nd and 9th columns correspond to the permutation $P_1$; the 3rd and 12th columns correspond to the permutation $P_2$; the 4th and 11th columns correspond to the permutation $P_3$; the 5th and 14th columns correspond to the permutation $P_4$; the 6th and 13th columns correspond to the permutation $P_5$; the 7th and 16th columns correspond to the permutation $P_6$; and the 8th and 15th columns correspond to the permutation $P_7$. FIG. 19 shows the data of 8 bits provided as a result of extraction of the odd-numbered data in the individual columns, hence, as a result of reduction of the data with the data reduction rate of $\frac{1}{2}$ and shows also the data permutated in the data permutation circuit 3.

The control signal $t_1$ applied to the inverse shuffle circuit 6 is in its "L" level which is the same as that applied to the selector 4, and the output data from the inverse shuffle circuit 6 are inverse shuffled as shown in FIG. 12. In the manner described above, extracted odd-numbered data of a bits appear from the inverse shuffle circuit 6.

Writing of data from the row direction, writing of data from the column direction, standard reading of data and $\frac{1}{2}$-reduced reading of data can be carried out in 8-bit parallel relation in the manner described above.

In the aforementioned embodiment of the present invention, odd-numbered data are read out when data are extracted with the data reduction rate of $\frac{1}{2}$. However, even-numbered data can be similarly extracted by changing the address values applied to the memory circuit 1.

When it is desired to write and read all the data in 8-bit parallel relation at the same processing speed from both the row direction and column direction, all the data are preferably divided into blocks of $16 \times 16$ bits having 16 bits in each of the row and column directions, and the operation described with reference to the aforementioned embodiment is preferably carried out for each of the blocks.

Reading of data with a data reduction rate of $\frac{1}{2}$ h ($h \leq 2$) can be similarly attained utilizing an expansion of the principle of the operation described with reference to the aforementioned embodiment.

We claim:

1. A data storage apparatus comprising:
   means for permutating data by making sequential correspondence between input data of $2^{n_1}$ bits and a set of permutations $P_k$ including permutations $P_{2^l}$ indicative of execution of permutations of all of $(2^{l+1}.i - 2^l - j)$th data and $(2^{l+1}.i - j)$th data among $2^{n_1}$ data, composed permutations $P_m$ indicative of subsequent execution of different permutations $P_{2^l}$ of data and an identity permutation $P_o$ indicative of execution of no permutation of data;
   a memory circuit including independently operable $2^{n_1}$ memories $m_1, m_2, \ldots m_{2^{n_1}}$ for storing said permutated data, and $n_1$ address inputs $a_0, a_1, \ldots, a_{n_1-1}$ connected to each of said $2^{n_1}$ memories in such a relation that common address inputs $a_l$ to memories $m_{2^l+1,i-2^l-j}$ apply an address value $u_l$ and common address inputs $a_l$ to memories $m_{2^l+1,i-j}$ apply an address value $v_l$;
   means for changing over said address values $u_l$ and $v_l$ to $v_l = u_l$ or $v_l = \overline{u_l}$; and
   means for permutating read-out data by making sequential correspondence between said read-out data and said set of permutations, where $$0 \leq l \leq n_1 - 1,$$

$$1 \leq i \leq 2^{n_1 - 1 - l}$$

$$0 \leq j \leq 2^l - 1,$$

$$m = l_1 + l_2 + \ldots + l_k,$$

and $$0 \leq k \leq 2^{n_1} - 1.$$

2. A data storage apparatus as claimed in claim 1, wherein one of said permutations $P_k$ is applied to said set of permutations $P_0, P_1, P_2, \ldots, P_{2^{n_1}-1}$ orderly arranged from $P_0$ to determine the order of permutations for permutating the input data of $2^{n_1}$ bits arranged in the row direction and column direction in a block composed of $2^{n_1} \times 2^{n_1}$ bits; the input data are permutated by making sequential correspondence between the permutations of the determined order and the row or column numbers of the input data in the block; the address values $u_l$ and $v_l$ applied to the memories are all selected to be $u_l = v_l$ corresponding to the data positions during data writing and reading from the row direction (column direction) in the block; the address values $u_l$ and $v_l$ applied to the memories are all selected to be $v_l = \overline{u_l}$ corresponding to the data positions during data writing and reading from the column direction (row direction) in the block; and the data of $2^{n_1}$ bits read out in the row direction (or column direction) in the block are permutated by making correspondence between one of said permutations $P_k$ and the row (column) numbers of the data in the block, whereby the data of $2^{n_1}$ bits arranged in the row direction in the block and the data of $2^{n_1}$ bits arranged in the column direction in the block can be written in and read out from the memories in bit-parallel relation of $2^{n_1}$ bits.

3. A data storage apparatus as claimed in claim 1, wherein the data in the block composed of $2^{2n_1}$ bits are divided into groups of data of $2^{n_1}$ bits constituting each of sub-blocks; one of said permutations $P_k$ is applied to said set of permutations $P_0, P_1, P_2, \ldots, P_{2^{n_1}-1}$ orderly arranged from $P_0$ to determine the order of permutations for permutating the input data of $2^{n_1}$ bits in the sub-block; the input data are permutated by making correspondence between the permutations of the determined order and the positions of the sub-blocks in the block; the address values $u_l$ and $v_l$ applied to the memories are all selected to be $u_l = u_l$ corresponding to the data positions during data writing and during data reading without any data reduction; the address values $\overline{u_l}$ and $v_l$ applied to the memories are selected to be $v_l = u_l$ ($0 \leq l \leq h_1 - 1$) and $v_l = u_l$ ($h_1 \leq l \leq n_1 - 1$) corresponding to the data positions to meet a data reduction rate of $\frac{1}{2}$ $h_1$ ($1 \leq h_1 \leq n_1$) during data reading with data reduction; the data of $2^{n_1}$ bits read out in the block are permutated by making correspondence between one of said permutations $P_k$ and the data positions in the block; and the data shuffled due to the data reduction are restored to the original arrangement, whereby reading of the data of $2^{n_1}$ bits in the block with the data reduction rate of $\frac{1}{2}^{h_1}$ can be effected in bit-parallel relation of $2^{n_1}$ bits.

4. A data storage apparatus as claimed in claim 1, wherein said permutating means is a circuit including $n^1 \times 2^{n_1-1}$ cells each of which permutates two input data and which are controlled by $n_1$ control signals, and each of the cell groups each including the $2^{n_1-1}$ cells is controlled by the same control signal for effecting the data permutation.

5. A data storage apparatus comprising:
  means for permutating data by making sequential correspondence between input data of $2^{n_1}$ bits including permutations $P_{2l}$ indicative of execution of permutations of all of $(2^{l+1}.i-2-j)$th data and $(2^{l+1}.i-j)$th data among $2^{n_1}$ data, composed permutations $P_m$ indicative of subsequent execution of different permutations $P_{2l}$ of data and an identity permutation $P_0$ indicative of execution of no permutation of data;
  a memory circuit including independently operable $2^{n_1}$ memories $m_1, m_2, \ldots, m_{2^{n_1}}$ for storing said permutated data, $n_1$ address inputs $a_0, a_1, \ldots, a_{n_1-1}$ connected to each of said $2^{n_1}$ memories in such a realtion that common address inputs $a_l$ to memories $m_{2l+1.i-2l-j}$ apply an address value $u_l$ and common address inputs $a_l$ to memories $m_{2l+1.i-j}$ apply an address value $v_l$, $n_2$ address inputs $b_0, b_1, \ldots, b_{n_2-1}$ connected to each of said $2^{n_1}$ memories in such a relation that common address inputs $b_s$ to memories $m_{2^{l+1}.p-2^l-q}$ apply an address value $x_s$ and common address input $b_s$ to memories $m_{2l+1.p-q}$ apply an address value $y_s$, and $n_2$ address inputs $c_0, c_1, \ldots, c_{n^2-1}$ connected to said $2^{n_1}$ memories in such a relation that common address inputs $c_s$ to the memories $m_{2^{l+1}.p-2^{l-q}}$ apply an address value $w_s$ and common address inputs $c_s$ to the memories $m_{2^{l+1}.p-q}$ apply an address value $z_s$;
  means for changing over said address values $u_l, v_l, x_s, y_s, w_s$ and $z_s$ to $v_l = u_l$ or $v_l = \overline{u_l}$, $y_s = x_s$ or $y_s = \overline{x_s}$, or $Z_s = w_s$ or $z_s = \overline{w_s}$; and
  means for permutating read-out data by making sequential correspondence between said read-out data and said set of permutations, where $n_1, n_2 \geq 1$, $0 \leq l \leq n_1 - 1$, $1 \leq i \leq 2^{n_1-1-l}$, $0 \leq j \leq 2^l - 1$, $m = l_1 + l_2 + \ldots + l_k$, $0 \leq k \leq 2^{n_1} - 1$, $0 \leq s \leq n_2 - 1$, $1 \leq p \leq 2^{n_1-1-t}$, (t: remainder of division of s by $n_1$)

$0 \leq q \leq 2^t - 1$, and $1 \leq h \leq n_2$.

6. A data storage apparatus as claimed in claim 5, wherein the data in the block composed of $2^{n_1+n_2}$ bits arranged in the row and column directions respectively are divided into groups each including $2^{n_1}$ bits in the row and column directions respectively to constitute sub-blocks each composed of $2^{n_1} \times 2^{n_1}$ bits; one of said permutations $P_k$ is applied to said set of permutations $P_0, P_1, P_2, \ldots, P_{2^{n_1}-1}$ orderly arranged from $P_0$ to determine the order of permutations for the input data of $2^{n_1}$ bits in the row direction (column direction) in the sub-block relative to the position of the sub-block in the block thereby permutating the input data by making sequential correspondence between the permutations of the determined order and the row (column) number of the input data in the sub-block; the address values $u_l$ and $v_l$ applied to the memories are all selected to be $v_l = u_l$ corresponding to the positions of the data during data writing and reading from the row direction (column direction) in said block; the address values $u_l$ and $v_l$ applied to the memories are all selected to be $v_l = \overline{u_l}$ during data writing and during data reading without any data reduction from the column direction (row direction); the address values $u_l$ and $v_l$ are selected to be $v_l = u_l$ ($l < h_1$) and $v_l = \overline{u_l}$ ($l \geq h_1$) corresponding to the positions of the data during data reading with a data reduction rate of $\frac{1}{2}^{h_1}$ ($1 \leq h_1 \leq n_2$) from the column direction (row direction); the address values $x_s, y_s, w_s$ and $z_s$ applied to the memories are all selected to be $y_s = x_s$ and $z_s = w_s$ corresponding to the positions of the data during data writing and during data reading without any data reduction; the address values $x_s, y_s, w_s$ and $z_s$ are all selected to be $z_s = w_s$, $y_s = \overline{x_s}$ ($s < h_1$) and $y_s = x_s$ ($s \geq h_1$) corresponding to the positions of the data during data reading from the row direction (column direction) with a data reduction rate of $\frac{1}{2}^{h_1}$ ($1 \leq h_1 \leq n_1$); the address values $x_s, y_s, w_s$ and $z_s$ are all selected to be $z_s = w_s$, $y_s = \overline{x_s}$ ($h_1 - n_1 \leq s < h_1$) and $y_s = x_s$ ($s < h_1 - n_1, s \geq h_1$) corresponding to the positions of the data during data reading from the row direction (column direction) with a data reduction rate of $\frac{1}{2}^{h_1}$ ($n_1 \leq h_1 \leq n_2$); the address values $x_s, y_s, w_s$ and $z_s$ are all selected to be $y_s = x_s$, $\overline{z_s} = w_s$ ($s < h_1$) and $z_s = w_s$ ($s \geq h_1$) corresponding to the positions of the data during data reading from the column direction (row direction) with a data reduction rate of $\frac{1}{2}^{h_1}$ ($1 \leq h_1 \leq n_1$); the address values $x_s, y_s, w_s$ and $z_s$ are all selected to be $y_s = x_s$, $z_s = w_s$ ($h_1 - n_1 \leq s \leq h_1$) and $z_s = w_s$ ($s < h_1 - n_1, s < h_1$) corresponding to the positions of the data during data reading from the column direction (row direction) with a data reduction rate of $\frac{1}{2}^{h_1}$ ($n_1 < h_1 \leq n_2$); the data of $2^{n_1}$ bits read out in the row direction (or column direction) in said block are permutated by making correspondence between one of said permutations $P_k$ and the row (column) numbers of the data in said block; and the data shuffled during the data reduction are restored to the original arrangement, whereby writing of the data of $2^{n_1}$ bits in the row direction and column direction in the block and reading of the data of $2^{n_1}$ bits in the row direction and column direction in the block with a data reduction rate of $\frac{1}{2}^{h_1}$ can be effected in bit-parallel relation of $2^{n_1}$ bits.

* * * * *